United States Patent
Wang et al.

(10) Patent No.: US 9,591,475 B2
(45) Date of Patent: Mar. 7, 2017

(54) WIRELESS LOCAL AREA NETWORK CONFIGURATION METHOD AND WIRELESS TERMINAL

(71) Applicant: Huawei Device Co., Ltd., Shenzhen (CN)

(72) Inventors: Hongjian Wang, Shenzhen (CN); Wei Chen, Shenzhen (CN); Fang Lei, Shenzhen (CN)

(73) Assignee: Huawei Device Co., Ltd., Shenzhen (CN)

(*) Notice: Subject to any disclaimer, the term of this patent is extended or adjusted under 35 U.S.C. 154(b) by 158 days.

(21) Appl. No.: 14/572,185

(22) Filed: Dec. 16, 2014

(65) Prior Publication Data

US 2015/0103814 A1  Apr. 16, 2015

Related U.S. Application Data

(63) Continuation of application No. PCT/CN2013/078752, filed on Jul. 3, 2013.

(30) Foreign Application Priority Data

Dec. 25, 2012 (CN) .......................... 2012 1 0571782

(51) Int. Cl.
*H04W 76/02* (2009.01)
*H04W 8/18* (2009.01)
(Continued)

(52) U.S. Cl.
CPC .......... *H04W 8/183* (2013.01); *H04W 48/16* (2013.01); *H04W 76/021* (2013.01); *H04W 84/12* (2013.01); *H04W 88/06* (2013.01)

(58) Field of Classification Search
None
See application file for complete search history.

(56) References Cited

U.S. PATENT DOCUMENTS

2005/0177733 A1\* 8/2005 Stadelmann .......... G06Q 30/04
713/185
2006/0135067 A1   6/2006 Dunko
(Continued)

FOREIGN PATENT DOCUMENTS

CN    101175283 A    5/2008
CN    101582945 A    11/2009
(Continued)

OTHER PUBLICATIONS

Partial English Translation and Abstract of Chinese Patent Application No. CN101175283A, Jan. 7, 2015, 4 pages.
Partial English Translation and Abstract of Chinese Patent Application No. CN101854673A, Jan. 7, 2015, 5 pages.
Foreign Communication From a Counterpart Application, PCT Application No. PCT/CN2013/078752, English Translation of International Search Report dated Oct. 10, 2013, 3 pages.
(Continued)

*Primary Examiner* — Chi H Pham
*Assistant Examiner* — Soon-Dong D Hyun
(74) *Attorney, Agent, or Firm* — Conley Rose, P.C.

(57) ABSTRACT

A wireless local area network configuration method and a wireless terminal. In embodiments of the present application, a first MCC is acquired from a user card of the wireless terminal, and then first wireless local area network configuration information corresponding to the first MCC is determined, so that wireless local area network configuration can be performed for the wireless terminal by using the first wireless local area network configuration information. Therefore, a problem in the prior art that an operation of wireless local area network configuration for a wireless terminal is complicated and error-prone can be resolved, thereby improving configuration efficiency and reliability.

10 Claims, 6 Drawing Sheets

(51) Int. Cl.
*H04W 84/12* (2009.01)
*H04W 88/06* (2009.01)
*H04W 48/16* (2009.01)

(56) References Cited

U.S. PATENT DOCUMENTS

| | | | |
|---|---|---|---|
| 2007/0237121 | A1 | 10/2007 | Khandelwal et al. |
| 2009/0286466 | A1 | 11/2009 | Kim et al. |
| 2010/0075711 | A1 | 3/2010 | Tsubouchi et al. |
| 2010/0095364 | A1 | 4/2010 | Norgaard et al. |
| 2011/0056503 | A1* | 3/2011 | Abraham ............ A47C 20/026 128/845 |
| 2011/0263250 | A1* | 10/2011 | Mueck .................. H04H 20/24 455/434 |
| 2012/0264402 | A1* | 10/2012 | Zhang ................. H04L 63/0815 455/411 |
| 2013/0258907 | A1* | 10/2013 | Chen ..................... H04W 28/24 370/259 |
| 2014/0093071 | A1* | 4/2014 | Qiang ................. H04L 63/0892 380/33 |

FOREIGN PATENT DOCUMENTS

| | | |
|---|---|---|
| CN | 101854673 A | 10/2010 |
| CN | 102630081 A | 8/2012 |
| CN | 102685718 A | 9/2012 |
| EP | 1655889 A1 | 5/2006 |
| EP | 2830339 A1 | 1/2015 |
| JP | 2007502556 A | 2/2007 |
| JP | 2007129301 A | 5/2007 |
| JP | 2008524922 A | 7/2008 |
| JP | 2009512257 A | 3/2009 |
| JP | 2010074802 A | 4/2010 |
| WO | 2006109124 A2 | 10/2006 |
| WO | 2007041626 A2 | 4/2007 |
| WO | 2012064860 A1 | 5/2012 |

OTHER PUBLICATIONS

Foreign Communication From a Counterpart Application, PCT Application No. PCT/CN2013/078752, Written Opinion dated Oct. 10, 2013, 4 pages.

"3rd Generation Partnership Project; Technical Specification Group Core Network and Terminals; 3GPP System to Wireless Local Area Network (WLAN) interworking; WLAN User Equipment (WLAN UE) to network protocols; Stage 3 (Release 11)," 3GPP TS 24.234, V11.3.0, Technical Specification, Jun. 2012, 42 pages.

"3rd Generation Partnership Project; Technical Specification Group Services and System Aspects; WLAN Network Selection for 3GPP Terminals; Stage 2 (Release 12)," 3GPP TR 23.865, V0.4.0, Technical Report, Nov. 2012, 18 pages.

Foreign Communication From a Counterpart Application, European Application No. 13867512.9, Extended European Search Report dated Jun. 22, 2015, 9 pages.

Partial English Translation and Abstract of Japanese Patent Application No. JPA2007129301, Apr. 15, 2016, 30 pages.

Partial English Translation and Abstract of Japanese Patent Application No. JPA2007502556, Apr. 15, 2016, 24 pages.

Partial English Translation and Abstract of Japanese Patent Application No. JPA2008524922, Apr. 15, 2016, 23 pages.

Partial English Translation and Abstract of Japanese Patent Application No. JPA2009512257, Apr. 15, 2016, 18 pages.

Partial English Translation and Abstract of Japanese Patent Application No. JPA201074802, Apr. 21, 2016, 27 pages.

Foreign Communication From a Counterpart Application, Japanese Application No. 2015-527765, Japanese Office Action dated Feb. 16, 2016, 6 pages.

Foreign Communication From a Counterpart Application, Japanese Application No. 2015-527765, English Translation of Japanese Office Action dated Feb. 16, 2016, 7 pages.

Foreign Communication From a Counterpart Application, Chinese Application No. 201210571782.5, Chinese Office Action dated Sep. 29, 2016, 6 pages.

\* cited by examiner

WIRELESS LOCAL AREA NETWORK CONFIGURATION METHOD AND WIRELESS TERMINAL

CROSS-REFERENCE TO RELATED APPLICATIONS

This application is a continuation of International Application No. PCT/CN2013/078752, filed on Jul. 3, 2013, which claims priority to Chinese Patent Application No. 201210571782.5, filed on Dec. 25, 2012, both of which are hereby incorporated by reference in their entireties.

TECHNICAL FIELD

The present application relates to communications technologies, and in particular, to a wireless local area network configuration method and a wireless terminal.

BACKGROUND

With development of communications technologies, more applications are integrated into a terminal device, for example, a wireless local area network (WLAN) function such as a wireless compatibility certification Wireless Fidelity (Wi-Fi) function, a Bluetooth® function, a radio frequency function, and an air mouse function. All the foregoing applications work on a same frequency band, for example, at 2.4 gigahertz (GHz), and therefore mutual interference may be caused. In the prior art, an operator can manually perform wireless local area network configuration for a wireless terminal.

However, an operation of the foregoing wireless local area network configuration for the wireless terminal is complicated and error-prone, thereby lowering configuration efficiency and reliability.

SUMMARY

According to multiple aspects of the present application, a wireless local area network configuration method and a wireless terminal are provided to improve configuration efficiency and reliability.

According to one aspect of the present application, a wireless local area network configuration method is provided, including: acquiring a first mobile country code (MCC) from a user card of a wireless terminal; determining first wireless local area network configuration information corresponding to the first MCC; and performing wireless local area network configuration for the wireless terminal by using the first wireless local area network configuration information.

According to the foregoing aspect and any possible implementation manner, an implementation manner is further provided, where the determining first wireless local area network configuration information corresponding to the first MCC is determining, according to a preset correspondence between an MCC and a wireless compatibility certification Wi-Fi country code, a first Wi-Fi country code corresponding to the first MCC; and determining, according to a preset correspondence between a Wi-Fi country code and wireless local area network configuration information, first wireless local area network configuration information corresponding to the first Wi-Fi country code.

According to the foregoing aspect and any possible implementation manner, an implementation manner is further provided, where after the performing wireless local area network configuration for the wireless terminal by using the first wireless local area network configuration information, the method further includes acquiring a second MCC corresponding to the wireless terminal from a wireless network accessed by the wireless terminal; determining, according to the correspondence between the MCC and Wi-Fi country code, a second Wi-Fi country code corresponding to the second MCC; comparing the second Wi-Fi country code with the first Wi-Fi country code; if the second Wi-Fi country code is inconsistent with the first Wi-Fi country code, determining, according to the correspondence between the Wi-Fi country code and wireless local area network configuration information, second wireless local area network configuration information corresponding to the second Wi-Fi country code; and performing wireless local area network configuration for the wireless terminal by using the second wireless local area network configuration information.

According to the foregoing aspect and any possible implementation manner, an implementation manner is further provided, where the determining first wireless local area network configuration information corresponding to the first MCC is determining, according to a preset correspondence between an MCC and wireless local area network configuration information, the first wireless local area network configuration information corresponding to the first MCC.

According to the foregoing aspect and any possible implementation manner, an implementation manner is further provided, where after the performing wireless local area network configuration for the wireless terminal by using the first wireless local area network configuration information, the method further includes acquiring a third MCC corresponding to the wireless terminal from a wireless network accessed by the wireless terminal; comparing the third MCC with the first MCC; if the third MCC is inconsistent with the first MCC, determining, according to the correspondence between the MCC and wireless local area network configuration information, third wireless local area network configuration information corresponding to the third MCC; and performing wireless local area network configuration for the wireless terminal by using the third wireless local area network configuration information.

According to the foregoing aspect and any possible implementation manner, an implementation manner is further provided, where the wireless local area network is a Wi-Fi network; and the wireless local area network configuration information includes optional Wi-Fi network channel information and an optional Wi-Fi network standard.

According to another aspect of the present application, a wireless terminal is provided, including an acquiring unit configured to acquire a first mobile country code MCC from a user card of the wireless terminal, and transmit the first MCC to a determining unit; the determining unit configured to determine first wireless local area network configuration information corresponding to the first MCC, and transmit the first wireless local area network configuration information to a configuring unit; and the configuring unit configured to perform wireless local area network configuration for the wireless terminal by using the first wireless local area network configuration information.

According to the foregoing aspect and any possible implementation manner, an implementation manner is further provided, where the determining unit is configured to determine, according to a preset correspondence between an MCC and a wireless compatibility certification Wi-Fi country code, a first Wi-Fi country code corresponding to the first MCC; and determine, according to a preset correspondence between a Wi-Fi country code and wireless local area network configuration information, first wireless local area network configuration information corresponding to the first Wi-Fi country code.

According to the foregoing aspect and any possible implementation manner, an implementation manner is further provided, where the wireless terminal further includes a first receiving unit, configured to acquire a second MCC corresponding to the wireless terminal from a wireless network accessed by the wireless terminal, and transmit the second MCC to the determining unit; the determining unit is further configured to determine, according to the correspondence between the MCC and Wi-Fi country code, a second Wi-Fi country code corresponding to the second MCC; compare the second Wi-Fi country code with the first Wi-Fi country code; and if the second Wi-Fi country code is inconsistent with the first Wi-Fi country code, determine, according to the correspondence between the Wi-Fi country code and wireless local area network configuration information, second wireless local area network configuration information corresponding to the second Wi-Fi country code, and transmit the second wireless local area network configuration information to the configuring unit; and the configuring unit is further configured to perform wireless local area network configuration for the wireless terminal by using the second wireless local area network configuration information.

According to the foregoing aspect and any possible implementation manner, an implementation manner is further provided, where the determining unit is configured to determine, according to a preset correspondence between an MCC and wireless local area network configuration information, the first wireless local area network configuration information corresponding to the first MCC.

According to the foregoing aspect and any possible implementation manner, an implementation manner is further provided, where the wireless terminal further includes a second receiving unit, configured to acquire a third MCC corresponding to the wireless terminal from a wireless network accessed by the wireless terminal, and transmit the third MCC to the determining unit; the determining unit is further configured to compare the third MCC with the first MCC; and if the third MCC is inconsistent with the first MCC, determine, according to the correspondence between the MCC and wireless local area network configuration information, third wireless local area network configuration information corresponding to the third MCC, and transmit the third wireless local area network configuration information to the configuring unit; and the configuring unit is further configured to perform wireless local area network configuration for the wireless terminal by using the third wireless local area network configuration information.

According to the foregoing aspect and any possible implementation manner, an implementation manner is further provided, where the wireless local area network is a Wi-Fi network; and the wireless local area network configuration information includes optional Wi-Fi network channel information and an optional Wi-Fi network standard.

It may be learned from the foregoing technical solutions that in the embodiments of the present application, a first MCC is acquired from a user card of a wireless terminal, and then first wireless local area network configuration information corresponding to the first MCC is determined, so that wireless local area network configuration can be performed for the wireless terminal by using the first wireless local area network configuration information. Therefore, a problem in the prior art that an operation of wireless local area network configuration for a wireless terminal is complicated and error-prone can be resolved, thereby improving configuration efficiency and reliability.

BRIEF DESCRIPTION OF DRAWINGS

To describe the technical solutions in the embodiments of the present application or more clearly, the following briefly introduces the accompanying drawings required for describing the embodiments. The accompanying drawings in the following description show some embodiments of the present application, and persons of ordinary skill in the art may still derive other drawings from these accompanying drawings without creative efforts.

DESCRIPTION OF EMBODIMENTS

To make the objectives, technical solutions, and advantages of the embodiments of the present application clearer, the following clearly describes the technical solutions in the embodiments of the present application with reference to the accompanying drawings in the embodiments of the present application. The described embodiments are merely a part rather than all of the embodiments of the present application. All other embodiments obtained by persons of ordinary skill in the art based on the embodiments of the present application without creative efforts shall fall within the protection scope of the present application.

The technical solutions of the present application may be applied to various wireless networks, for example, a Global System for Mobile Communications (GSM) network, a general packet radio service (GPRS) system network, a Code Division Multiple Access (CDMA) system network, a CDMA2000 system network, a Wideband Code Division Multiple Access (WCDMA) system network, a Long Term Evolution (LTE) system network, and a Worldwide Interoperability for Microwave Access (WiMAX) system network.

It should be noted that a wireless terminal in the embodiments of the present invention may include but is not limited to a mobile vehicle-mounted device, a mobile phone, a personal digital assistant (PDA), a wireless handheld device, a wireless netbook, a personal computer, a data card, or a machine to machine (M2M) wireless module.

In addition, the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

Figure 1:
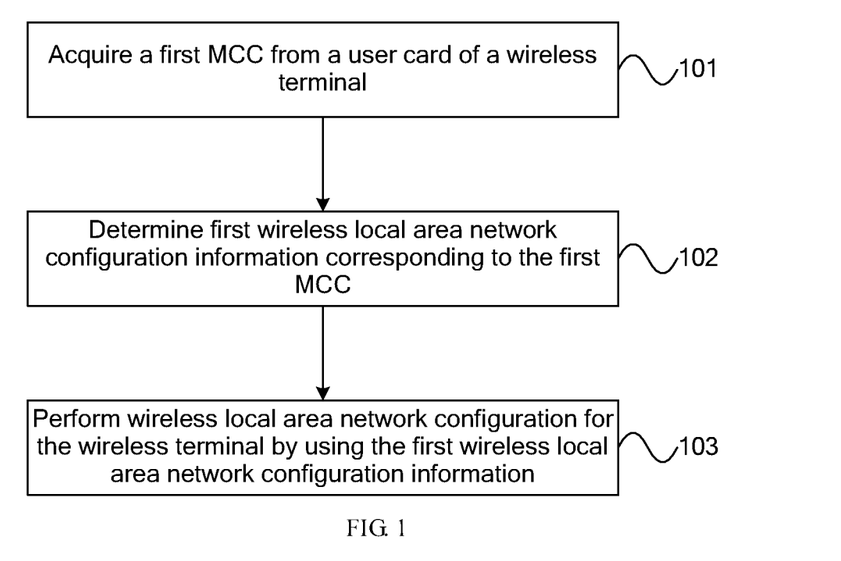
FIG. 1 is a schematic flowchart of a wireless local area network configuration method according to an embodiment of the present application.

FIG. 1 is a schematic flowchart of a wireless local area network configuration method according to an embodiment of the present application, as shown in FIG. 1.

101: Acquire a first mobile country code (MCC) from a user card of a wireless terminal;

102: Determine first wireless local area network configuration information corresponding to the first MCC; and

103: Perform wireless local area network configuration for the wireless terminal by using the first wireless local area network configuration information.

It should be noted that 101 to 103 may be executed by the wireless terminal.

The user card may include but is not limited to a subscriber identity module (SIM) card in a GSM network or a GPRS system network, a user identity module (UIM) card in a CDMA system network, a universal subscriber identity module (USIM) card in a CDMA2000 system network or a WCDMA system work.

Optionally, in a possible implementation manner of this embodiment, the wireless local area network may be a Wi-Fi network; correspondingly, the wireless local area network configuration information may include but is not limited to optional Wi-Fi network channel information and an optional Wi-Fi network standard.

The optional Wi-Fi network channel information refers to an available channel. A spectrum assignment and an operational constraint are inconsistent in global operations. There are 11 paths (1 to 11) on a 2.4 GHz frequency band in a standard used in the USA; there is another path in China, that is, 12 paths (1 to 12); and there are another two paths in most of Europe, that is, 13 paths (1 to 13). In addition, another path needs to be added in Japan, that is, 14 paths (1 to 14).

The optional Wi-Fi network standard refers to an available wireless local area network standard, for example, at least one of the wireless local area network standard 802.11a, the wireless local area network standard 802.11b, the wireless local area network standard 802.11g, and the wireless local area network standard 802.11n.

Figure 2:
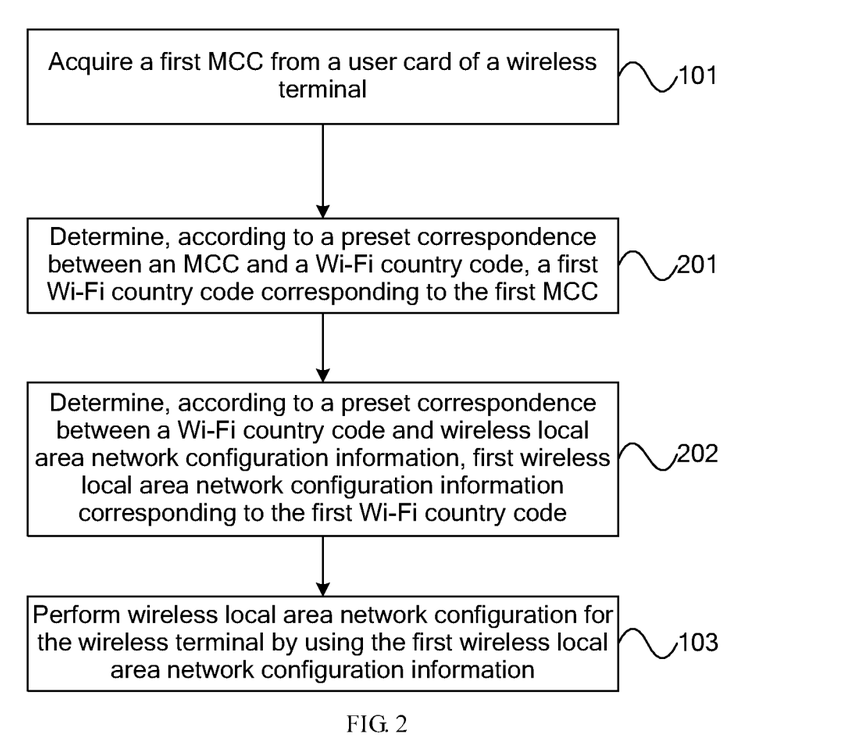
FIG. 2 is a schematic flowchart of a wireless local area network configuration method according to another embodiment of the present application.

As shown in FIG. 2, in 102 the wireless terminal may include:

201: Determine, according to a preset correspondence between an MCC and a Wi-Fi country code, a first Wi-Fi country code corresponding to the first MCC; and

202: Determine, according to a preset correspondence between a Wi-Fi country code and wireless local area network configuration information, first wireless local area network configuration information corresponding to the first Wi-Fi country code.

Figure 3:
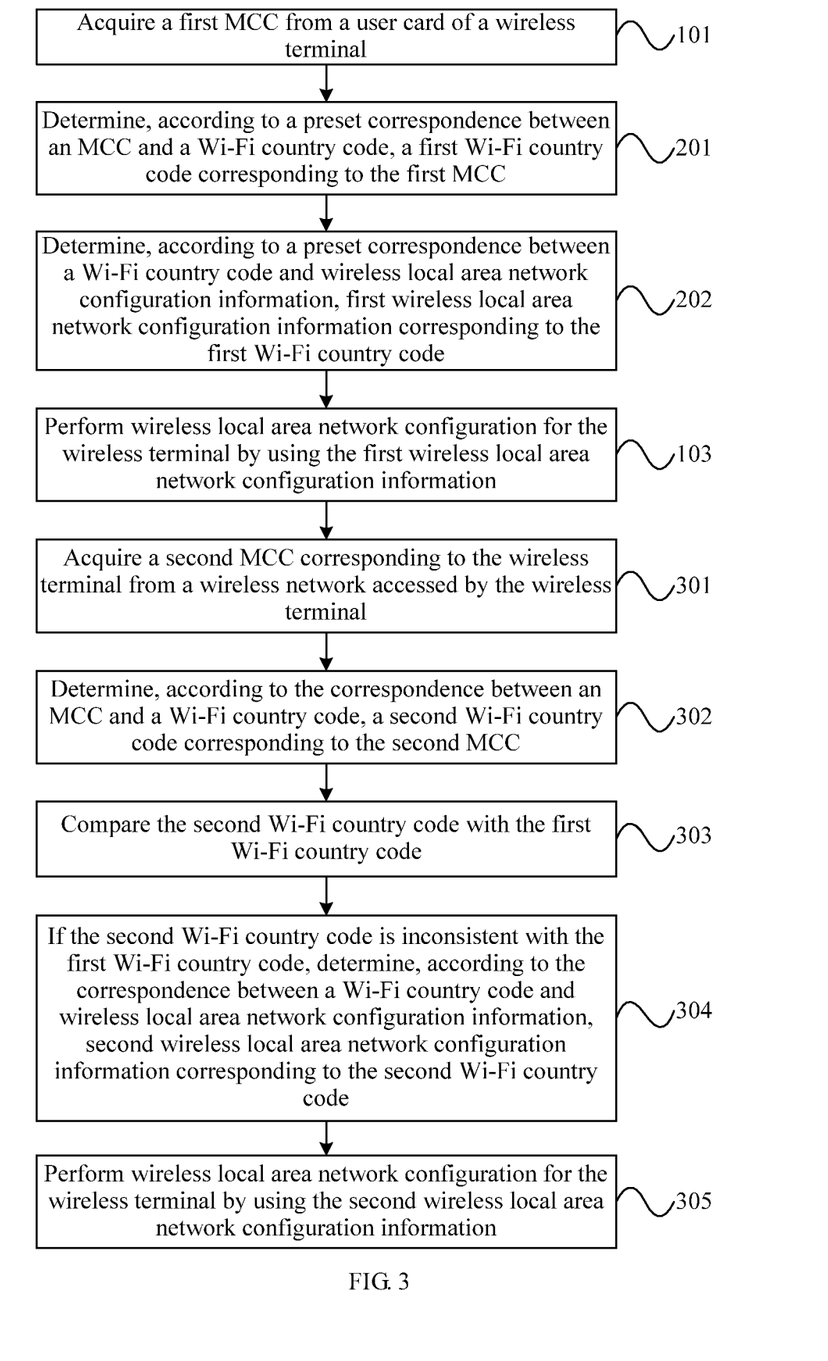
FIG. 3 is a schematic flowchart of a wireless local area network configuration method according to another embodiment of the present application.

As shown in FIG. 3, after 103, the wireless terminal may further include:

301: Acquire a second MCC corresponding to the wireless terminal from a wireless network accessed by the wireless terminal;

302: Determine, according to the correspondence between the MCC and Wi-Fi country code, a second Wi-Fi country code corresponding to the second MCC;

303: Compare the second Wi-Fi country code with the first Wi-Fi country code;

304: If the second Wi-Fi country code is inconsistent with the first Wi-Fi country code, determine, according to the correspondence between the Wi-Fi country code and wireless local area network configuration information, second wireless local area network configuration information corresponding to the second Wi-Fi country code; and

305: Perform wireless local area network configuration for the wireless terminal by using the second wireless local area network configuration information.

Optionally, in a possible implementation manner of this embodiment, the wireless local area network may be a Wi-Fi network; correspondingly, the wireless local area network configuration information may include but is not limited to a Wi-Fi country code, optional Wi-Fi network channel information, and an optional Wi-Fi network standard.

The optional Wi-Fi network channel information refers to an available channel. A spectrum assignment and an operational constraint are inconsistent in global operations. There are 11 paths (1 to 11) on a 2.4 GHz frequency band in a standard used in the USA; there is another path in China, that is, 12 paths (1 to 12); and there are another two paths in most of Europe, that is, 13 paths (1 to 13). In addition, another path needs to be added in Japan, that is, 14 paths (1 to 14).

The optional Wi-Fi network standard refers to an available wireless local area network standard, for example, at least one of the wireless local area network standard 802.11a, the wireless local area network standard 802.11b, the wireless local area network standard 802.11g, and the wireless local area network standard 802.11n.

Figure 4:
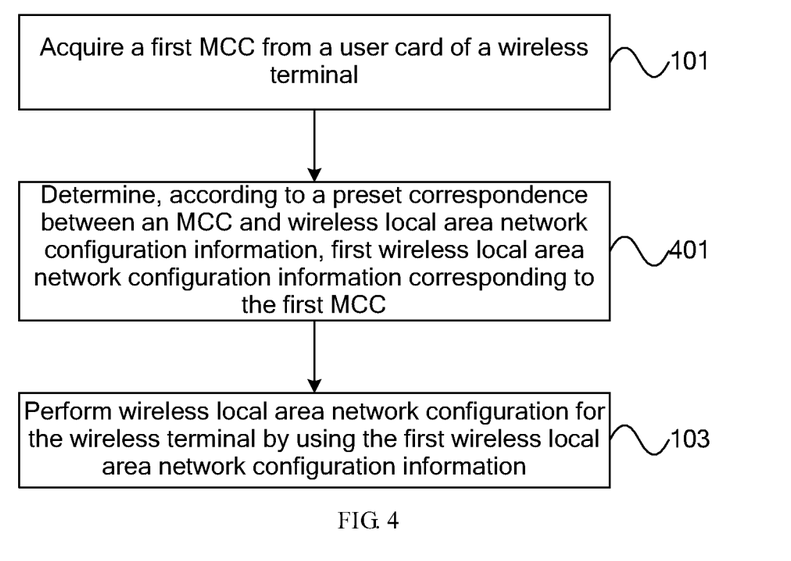
FIG. 4 is a schematic flowchart of a wireless local area network configuration method according to another embodiment of the present application.

Optionally, in a possible implementation manner of this embodiment, as shown in FIG. 4, in 102, the wireless terminal may include:

401: Determine, according to a preset correspondence between an MCC and wireless local area network configuration information, first wireless local area network configuration information corresponding to the first MCC.

Figure 5:
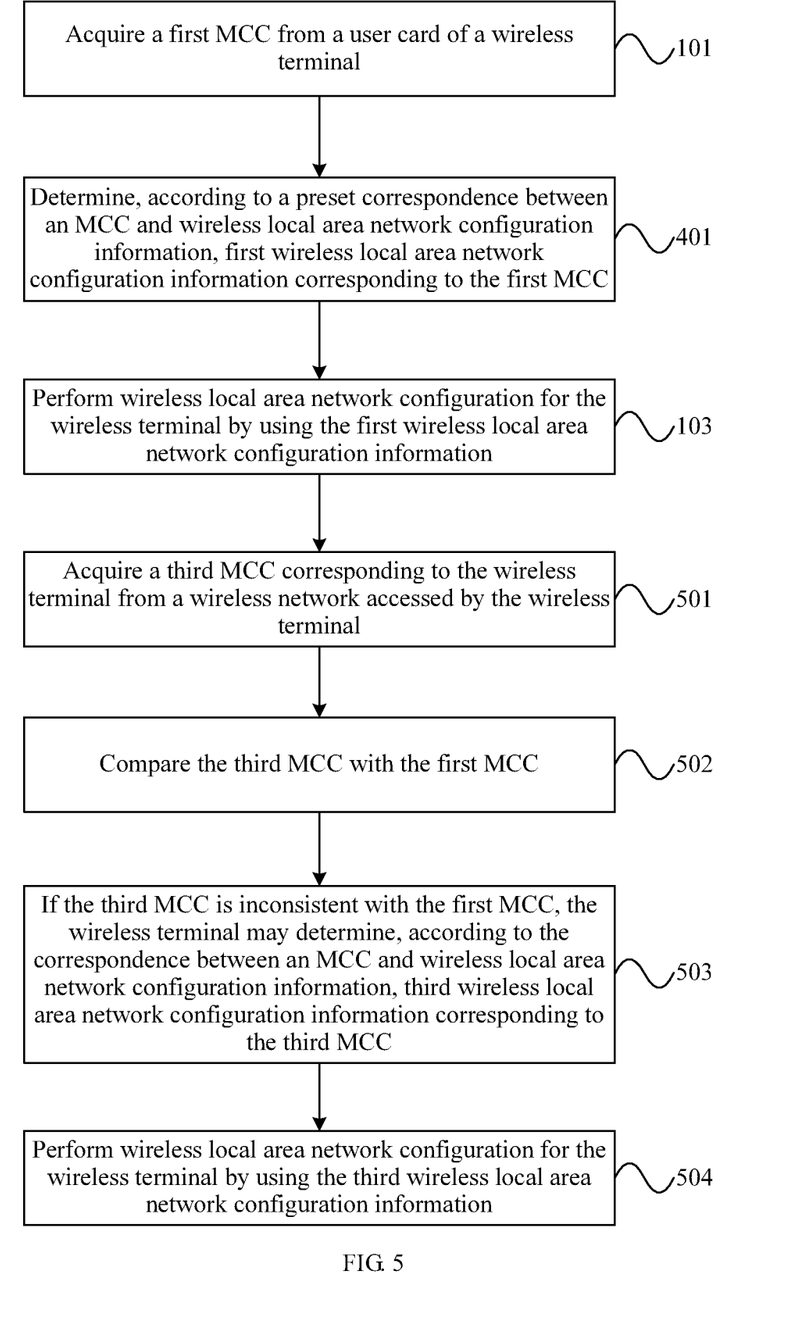
FIG. 5 is a schematic flowchart of a wireless local area network configuration method according to another embodiment of the present application.

As shown in FIG. 5, after 103, the wireless terminal may further include:

501: Acquire a third MCC from a wireless network accessed by the wireless terminal;

502: Compare the third MCC with the first MCC;

503: If the third MCC is inconsistent with the first MCC, the wireless terminal may determine, according to the correspondence between an MCC and wireless local area network configuration information, third wireless local area network configuration information corresponding to the third MCC; and

504: Perform wireless local area network configuration for the wireless terminal by using the third wireless local area network configuration information.

In this embodiment, a first MCC is acquired from a user card of a wireless terminal, and then first wireless local area network configuration information corresponding to the first MCC is determined, so that wireless local area network configuration can be performed for the wireless terminal by using the first wireless local area network configuration information. Therefore, a problem in the prior art that an operation of wireless local area network configuration for a wireless terminal is complicated and error-prone can be resolved, thereby improving configuration efficiency and reliability.

It should be noted that, for ease of description, each foregoing method embodiment is described as a combination of a series of actions. However, persons skilled in the art should understand that the present application is not limited to the sequence of the described actions, because certain steps according to the present application may be performed in another sequence or concurrently. In addition, persons skilled in the art should also understand that the embodiments described in the specification are exemplary embodiments, and the actions and modules mentioned are not necessarily required by the present application.

In the foregoing embodiments, the description of each embodiment has different emphasis; for content that is not detailed in an embodiment, refer to related description in another embodiment.

Figure 6:
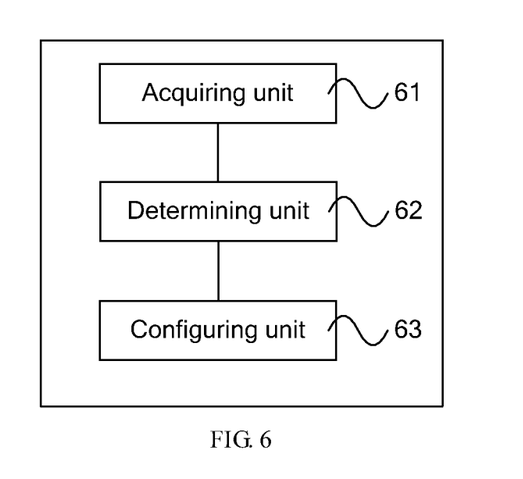
FIG. 6 is a schematic structural diagram of a wireless terminal according to another embodiment of the present application.

FIG. 6 is a schematic structural diagram of a wireless terminal according to another embodiment of the present application, as shown in FIG. 6. The wireless terminal in this embodiment may include an acquiring unit 61, a determining unit 62, and a configuring unit 63. The acquiring unit 61 is configured to acquire a first MCC from a user card of the wireless terminal, and transmit the first MCC to the determining unit 62; the determining unit 62 is configured to determine first wireless local area network configuration information corresponding to the first MCC, and transmit the first wireless local area network configuration information to the configuring unit 63; and the configuring unit 63 is configured to perform wireless local area network configuration for the wireless terminal by using the first wireless local area network configuration information.

The user card may include but is not limited to a SIM card in a GSM network or a GPRS system network, a UIM card in a CDMA system network, a USIM card in a CDMA2000 system network or a WCDMA system work.

Optionally, in a possible implementation manner of this embodiment, the wireless local area network may be a Wi-Fi network; correspondingly, the wireless local area network configuration information may include but is not limited to optional Wi-Fi network channel information and an optional Wi-Fi network standard.

The optional Wi-Fi network channel information refers to an available channel. A spectrum assignment and an operational constraint are inconsistent in global operations. There are 11 paths (1 to 11) on a 2.4 GHz frequency band in a standard used in the USA; there is another path in China, that is, 12 paths (1 to 12); and there are another two paths in most of Europe, that is, 13 paths (1 to 13). In addition, another path needs to be added in Japan, that is, 14 paths (1 to 14).

The optional Wi-Fi network standard refers to an available wireless local area network standard, for example, at least one of the wireless local area network standard 802.11a, the wireless local area network standard 802.11b, the wireless local area network standard 802.11g, and the wireless local area network standard 802.11n.

The determining unit 62 may be configured to determine, according to a preset correspondence between an MCC and a Wi-Fi country code, a first Wi-Fi country code corresponding to the first MCC; and determine, according to a preset correspondence between a Wi-Fi country code and wireless local area network configuration information, first wireless local area network configuration information corresponding to the first Wi-Fi country code.

Figure 7:
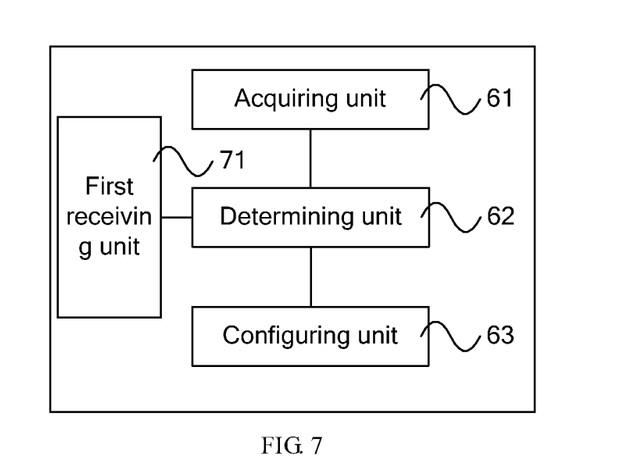
FIG. 7 is a schematic structural diagram of a wireless terminal according to another embodiment of the present application.

As shown in FIG. 7, the wireless terminal provided in this embodiment may further include a first receiving unit 71 configured to acquire a second MCC corresponding to the wireless terminal from a wireless network accessed by the wireless terminal, and transmit the second MCC to the determining unit 62. Correspondingly, the determining unit 62 may further be configured to determine, according to the correspondence between the MCC and Wi-Fi country code, a second Wi-Fi country code corresponding to the second MCC; compare the second Wi-Fi country code with the first Wi-Fi country code; and if the second Wi-Fi country code is inconsistent with the first Wi-Fi country code, determine, according to the correspondence between the Wi-Fi country code and wireless local area network configuration information, second wireless local area network configuration information corresponding to the second Wi-Fi country code, and transmit the second wireless local area network configuration information to the configuring unit 63. The configuring unit 63 may be configured to perform wireless local area network configuration for the wireless terminal by using the second wireless local area network configuration information.

Optionally, in a possible implementation manner of this embodiment, the wireless local area network may be a Wi-Fi network; correspondingly, the wireless local area network configuration information may include but is not limited to a Wi-Fi country code, optional Wi-Fi network channel information, and an optional Wi-Fi network standard.

Optionally, in a possible implementation manner of this embodiment, the determining unit 62 may be specifically configured to determine, according to a preset correspondence between an MCC and wireless local area network configuration information, the first wireless local area network configuration information corresponding to the first MCC.

Figure 8:
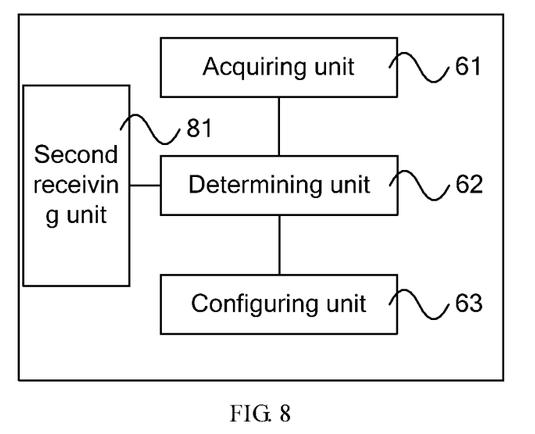
FIG. 8 is a schematic structural diagram of a wireless terminal according to another embodiment of the present application.

As shown in FIG. 8, the wireless terminal provided in this embodiment may further include a second receiving unit 81 configured to acquire a third MCC from a wireless network accessed by the wireless terminal, and transmit the third MCC to the determining unit 62. Correspondingly, the determining unit 62 may further be configured to compare the third MCC with the first MCC; and if the third MCC is inconsistent with the first MCC, determine, according to the correspondence between an MCC and wireless local area network configuration information, third wireless local area network configuration information corresponding to the third MCC, and transmit the third wireless local area network configuration information to the configuring unit 63. The configuring unit 63 may be configured to perform wireless local area network configuration for the wireless terminal by using the third wireless local area network configuration information.

In this embodiment, a wireless terminal acquires a first MCC from a user card of the wireless terminal by using an acquiring unit, and then a determining unit determines first wireless local area network configuration information corresponding to the first MCC, so that a configuring unit can perform wireless local area network configuration for the wireless terminal by using the first wireless local area network configuration information. Therefore, a problem in the prior art that an operation of wireless local area network configuration for a wireless terminal is complicated and error-prone can be resolved, thereby improving configuration efficiency and reliability.

Figure 9:
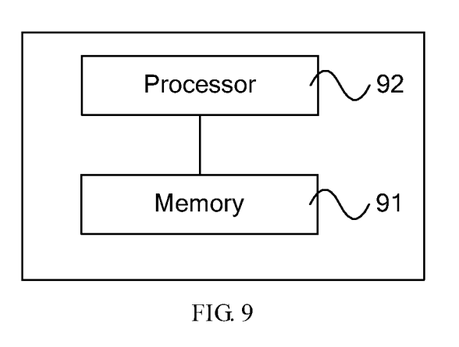
FIG. 9 is a schematic structural diagram of a wireless terminal according to another embodiment of the present application.

FIG. 9 is a schematic structural diagram of a wireless terminal according to another embodiment of the present application, as shown in FIG. 9. The wireless terminal in this embodiment may include a memory 91 and at least one processor 92. The memory 91 is configured to store executable program code; and the processor 92 runs a program corresponding to the executable program code by reading the executable program code stored in the memory 91, so as to acquire a first MCC from a user card of the wireless terminal; determine, according to a preset correspondence between an MCC and wireless local area network configuration information, first wireless local area network configuration information corresponding to the first MCC; and perform wireless local area network configuration for the wireless terminal by using the first wireless local area network configuration information.

The user card may include but is not limited to a subscriber identity module (SIM) card in a GSM network or a GPRS system network, a user identity module (UIM) card in a CDMA system network, a universal subscriber identity module (USIM) card in a CDMA2000 system network or a WCDMA system work.

Optionally, in a possible implementation manner of this embodiment, the wireless local area network may be a Wi-Fi network; correspondingly, the wireless local area network configuration information may include but is not limited to optional Wi-Fi network channel information and an optional Wi-Fi network standard.

The optional Wi-Fi network channel information refers to an available channel. A spectrum assignment and an operational constraint are inconsistent in global operations. There are 11 paths (1 to 11) on a 2.4 GHz frequency band in a standard used in the USA; there is another path in China, that is, 12 paths (1 to 12); and there are another two paths in most of Europe, that is, 13 paths (1 to 13). In addition, another path needs to be added in Japan, that is, 14 paths (1 to 14).

The optional Wi-Fi network standard refers to an available wireless local area network standard, for example, at least one of the wireless local area network standard 802.11a, the wireless local area network standard 802.11b, the wireless local area network standard 802.11g, and the wireless local area network standard 802.11n.

The processor 92 may be configured to determine, according to a preset correspondence between an MCC and a Wi-Fi country code, a first Wi-Fi country code corresponding to the first MCC; and determine, according to a preset correspondence between a Wi-Fi country code and wireless local area network configuration information, first wireless local area network configuration information corresponding to the first Wi-Fi country code.

The processor 92 may further be configured to acquire a second MCC corresponding to the wireless terminal from a wireless network accessed by the wireless terminal, and transmit the second MCC to the processor 92. Correspondingly, the processor 92 may further be configured to determine, according to the correspondence between the MCC and Wi-Fi country code, a second Wi-Fi country code corresponding to the second MCC; compare the second Wi-Fi country code with the first Wi-Fi country code; and if the second Wi-Fi country code is inconsistent with the first Wi-Fi country code, determine, according to the correspondence between the Wi-Fi country code and wireless local area network configuration information, second wireless local area network configuration information corresponding to the second Wi-Fi country code, and transmit the second wireless local area network configuration information to the processor 92. The processor 92 may be configured to perform wireless local area network configuration for the wireless terminal by using the second wireless local area network configuration information.

Optionally, in a possible implementation manner of this embodiment, the wireless local area network may be a Wi-Fi network; correspondingly, the wireless local area network configuration information may include but is not limited to a Wi-Fi country code, optional Wi-Fi network channel information, and an optional Wi-Fi network standard.

Optionally, in a possible implementation manner of this embodiment, the processor 92 may be configured to determine, according to a preset correspondence between an MCC and wireless local area network configuration information, the first wireless local area network configuration information corresponding to the first MCC.

The processor 92 may be further configured to acquire a third MCC from a wireless network accessed by the wireless terminal, and transmit the third MCC to the processor 92. Correspondingly, the processor 92 may further be configured to compare the third MCC with the first MCC; and if the third MCC is inconsistent with the first MCC, determine, according to the correspondence between an MCC and wireless local area network configuration information, third wireless local area network configuration information corresponding to the third MCC, and transmit the third wireless local area network configuration information to the processor 92. The processor 92 may be configured to perform wireless local area network configuration for the wireless terminal by using the third wireless local area network configuration information.

In this embodiment, a wireless terminal acquires a first MCC from a user card of the wireless terminal by using a processor, and then the processor determines first wireless local area network configuration information corresponding to the first MCC, so that the processor can perform wireless local area network configuration for the wireless terminal by using the first wireless local area network configuration information. Therefore, a problem in the prior art that an operation of wireless local area network configuration for a wireless terminal is complicated and error-prone can be resolved, thereby improving configuration efficiency and reliability.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present application may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) or a processor to perform a part of the steps of the methods described in the embodiments of the present application. The foregoing storage medium includes: any medium that can store program code, such as a universal serial bus (USB) flash drive, a removable hard disk, a read-only memory (ROM), a random access memory (RAM), a magnetic disk, or an optical disc.

Finally, it should be noted that the foregoing embodiments are merely intended for describing the technical solutions of the present application, but not for limiting the present application. Although the present application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present application.

What is claimed is:

1. A wireless local area network configuration method for enabling communication on a wireless local area network, the method comprising:
   acquiring a first mobile country code (MCC) from a user card of a wireless terminal;
   determining a first wireless local area network configuration information corresponding to the first MCC, which comprises determining, according to a preset correspondence between the MCC and wireless local area network configuration information, the first wireless local area network configuration information corresponding to the first MCC; and
   performing a wireless local area network configuration for the wireless terminal using the first wireless local area network configuration information.

2. The method according to claim 1, wherein determining the first wireless local area network configuration information corresponding to the first MCC further comprises:
   determining, according to a preset correspondence between the MCC and a wireless compatibility certification Wireless Fidelity (Wi-Fi) country code, a first Wi-Fi country code corresponding to the first MCC; and
   determining, according to a preset correspondence between a Wi-Fi country code and wireless local area network configuration information, the first wireless local area network configuration information corresponding to the first Wi-Fi country code.

3. The method according to claim 2, wherein after performing the wireless local area network configuration for the wireless terminal using the first wireless local area network configuration information, the method further comprises:
   acquiring a second MCC corresponding to the wireless terminal from a wireless network accessed by the wireless terminal;
   determining, according to the preset correspondence between the MCC and the Wi-Fi country code, a second Wi-Fi country code corresponding to the second MCC;
   comparing the second Wi-Fi country code with the first Wi-Fi country code;
   determining, according to the preset correspondence between the Wi-Fi country code and wireless local area network configuration information, a second wireless local area network configuration information corresponding to the second Wi-Fi country code when the second Wi-Fi country code is inconsistent with the first Wi-Fi country code; and
   performing the wireless local area network configuration for the wireless terminal using the second wireless local area network configuration information.

4. The method according to claim 1, wherein after performing the wireless local area network configuration for the wireless terminal using the first wireless local area network configuration information, the method further comprises:
   acquiring a third MCC corresponding to the wireless terminal from a wireless network accessed by the wireless terminal;
   comparing the third MCC with the first MCC;
   determining, according to the preset correspondence between the MCC and wireless local area network configuration information, third wireless local area network configuration information corresponding to the third MCC when the third MCC is inconsistent with the first MCC; and
   performing the wireless local area network configuration for the wireless terminal using the third wireless local area network configuration information.

5. The method according to claim 1, wherein the wireless local area network is a Wi-Fi network, and wherein the wireless local area network configuration information comprises optional Wi-Fi network channel information and an optional Wi-Fi network standard.

6. A wireless terminal, comprising:
   memory for storing executable instructions;
   a processor configured to execute the executable instructions to:
       acquire a first mobile country code (MCC) from a user card of the wireless terminal; and
       determine, according to a preset correspondence between an MCC and wireless local area network configuration information, a first wireless local area network configuration information corresponding to the first MCC; and
       perform a wireless local area network configuration for the wireless terminal using the first wireless local area network configuration information for enabling the wireless terminal to communicate on a wireless local area network.

7. The wireless terminal according to claim 6, wherein the processor is further configured to execute the executable instructions to:
   determine, according to a preset correspondence between the MCC and a wireless compatibility certification Wireless Fidelity (Wi-Fi) country code, a first Wi-Fi country code corresponding to the first MCC; and
   determine, according to a preset correspondence between a Wi-Fi country code and the wireless local area network configuration information, the first wireless local area network configuration information corresponding to the first Wi-Fi country code.

8. The wireless terminal according to claim 7, wherein the processor is further configured to execute the executable instructions to:
   acquire a second MCC corresponding to the wireless terminal from a wireless network accessed by the wireless terminal; and
   determine, according to the preset correspondence between the MCC and the Wi-Fi country code, a second Wi-Fi country code corresponding to the second MCC;

compare the second Wi-Fi country code with the first Wi-Fi country code; and if the second Wi-Fi country code is inconsistent with the first Wi-Fi country code;

determine, according to the preset correspondence between the Wi-Fi country code and wireless local area network configuration information, a second wireless local area network configuration information corresponding to the second Wi-Fi country code; and perform the wireless local area network configuration for the wireless terminal using the second wireless local area network configuration information.

9. The wireless terminal according to claim 6, wherein the processor is further configured to execute the executable instructions to:

acquire a third MCC corresponding to the wireless terminal from a wireless network accessed by the wireless terminal;

compare the third MCC with the first MCC;

determine, according to the preset correspondence between the MCC and wireless local area network configuration information, a third wireless local area network configuration information corresponding to the third MCC when the third MCC is inconsistent with the first MCC; and perform the wireless local area network configuration for the wireless terminal using the third wireless local area network configuration information.

10. The wireless terminal according to claim 6, wherein the wireless local area network is a WiFi network, and wherein the wireless local area network configuration information comprises optional Wi-Fi network channel information and an optional Wi-Fi network standard.

* * * * *